US011902154B2

(12) United States Patent
Inoue et al.

(10) Patent No.: US 11,902,154 B2
(45) Date of Patent: Feb. 13, 2024

(54) NETWORK SETTING DEVICE, METHOD AND PROGRAM

(71) Applicant: NIPPON TELEGRAPH AND TELEPHONE CORPORATION, Tokyo (JP)

(72) Inventors: Takeru Inoue, Musashino (JP); Atsushi Taniguchi, Musashino (JP); Toru Mano, Musashino (JP); Kazuya Anazawa, Musashino (JP); Kohei Mizuno, Musashino (JP); Kengo Nakamura, Musashino (JP); Masaaki Nishino, Musashino (JP); Norihito Yasuda, Musashino (JP); Masakazu Ishihata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/913,468

(22) PCT Filed: Apr. 21, 2020

(86) PCT No.: PCT/JP2020/017123
§ 371 (c)(1),
(2) Date: Sep. 22, 2022

(87) PCT Pub. No.: WO2021/214847
PCT Pub. Date: Oct. 28, 2021

(65) Prior Publication Data
US 2023/0132633 A1 May 4, 2023

(51) Int. Cl.
*H04L 45/42* (2022.01)
*H04L 45/02* (2022.01)
(Continued)

(52) U.S. Cl.
CPC .............. *H04L 45/42* (2013.01); *H04L 45/02* (2013.01); *H04L 45/08* (2013.01); *H04L 45/48* (2013.01); *H04L 45/566* (2013.01)

(58) Field of Classification Search
CPC ....... H04L 45/566; H04L 45/08; H04L 45/42; H04L 45/48; H04L 45/02
See application file for complete search history.

(56) References Cited

U.S. PATENT DOCUMENTS

2005/0169186 A1 8/2005 Qiu et al.
2018/0041400 A1 2/2018 Ngoo et al.
(Continued)

OTHER PUBLICATIONS

A. Gember-Jacobson et al., "Automatically repairing network control planes using an abstract representation", in Proceedings of the 26th Symposium on Operating Systems Principles, ser. SOSP '17. New York, NY, USA: ACM, 2017, pp. 359-373. (http://doi.acm.org/10.1145/3132747.3132753).
(Continued)

*Primary Examiner* — Nam T Tran
(74) *Attorney, Agent, or Firm* — Harness, Dickey & Pierce, P.L.C.

(57) ABSTRACT

An object of the present disclosure is to perform automatic restoration from network failures even when complicated operations for executing a plurality of commands are required. The present disclosure relates to a network setting device that is communicatively connected to a plurality of network devices and performs a setting of the plurality of network devices. The network setting device performs a first step for determining whether a network including the plurality of network devices satisfies a predetermined operational policy. When the predetermined operational policy is not satisfied, the network setting device executes processing for: performing a second step for determining whether a reachable range of a packet expands with addition of one of
(Continued)

one or more new candidate commands to a temporary update command sequence; deleting a command at an end of the temporary update command sequence on condition that the reachable range does not expand with addition of any one of the new commands; and then returning to the first step, until the predetermined operational policy is satisfied.

3 Claims, 10 Drawing Sheets

(51) Int. Cl.
*H04L 45/00* (2022.01)
*H04L 45/48* (2022.01)

(56) References Cited

U.S. PATENT DOCUMENTS

| | | | |
|---|---|---|---|
| 2020/0296000 A1* | 9/2020 | Smith | H04L 41/147 |
| 2021/0029015 A1* | 1/2021 | Khoury | H04L 45/02 |
| 2022/0200900 A1* | 6/2022 | Roweth | H04L 45/566 |

OTHER PUBLICATIONS

A. Gember-Jacobson et al., "Automatically repairing network control planes using an abstract representation", https://www.sigops.org/s/conferences/sosp/2017/slides/gemberj-sosp17-slides.optx, 2017.
"An open source network configuration analysis tool", Batfish, https://www.batfish.org, retrieved on Feb. 3, 2020.
S. J. Russell et al., "Artificial intelligence: a modern approach", Pearson Education, 2010.

* cited by examiner

Fig. 1

- PACKET HEADER
    - TRANSMISSION SOURCE ADDRESS: 1.1.1.1
    - DESTINATION ADDRESS: 9.9.9.9
- TRANSMISSION SOURCE ROUTER: S
- DESTINATION ROUTER: T

INPUT
- TOPOLOGY
- ROUTER SETTINGS
- OPERATIONAL POLICY

PROPOSED TECHNOLOGY

OUTPUT
- SETTING UPDATE COMMAND SEQUENCE

Fig. 6

$$\left[ \begin{array}{ll} \text{@ROUTER T} & \text{@ROUTER A} \\ \text{router eigrp 1} & \text{router eigrp 1} \\ \text{network 9.9.9.9 0.0.0.0} & \text{passive-interface e0} \end{array} \right]$$

NETWORK SETTING DEVICE, METHOD AND PROGRAM

CROSS-REFERENCE TO RELATED APPLICATIONS

This application is a 371 U.S. National Phase of International Application No. PCT/JP2020/017123, filed on Apr. 21, 2020. The entire disclosure of the above application is incorporated herein by reference.

TECHNICAL FIELD

The present disclosure relates to setting management for a network device.

BACKGROUND ART

A network operator sets an address, a route control protocol, and the like in a network device such as a router. The router creates a routing table according to settings and transfers a packet. When the settings contain an error, the packet does not reach the destination according to an operational policy, and a failure occurs. When such a failure occurs, the network operator specifies the router that is the cause and updates the settings.

In order for a packet to reach the destination correctly, all routers between the transmission and/or reception terminals have to be set correctly. In addition, items affecting reachability are diverse (an interface address, a route control protocol, an access control list, and the like), and thus high skill is required for restoration from a failure. Further, even with required skill, inspecting many items takes time.

In recent years, many studies have been carried out on automatic restoration from a failure. In NPL 1, settings to be added to a router are autonomously searched for by specifying a portion that has not reached its destination in a graph (FIGS. 3 and 4 in NPL 1) expressing how route information is exchanged on a network. While a restoration method is efficiently searched for by limiting targets to routing information exchanges, failures caused by other settings such as an interface are not dealt with. In other words, a network model such as a model supporting routing information exchanges is incorporated in the searching of a restoration method, and failures deviating from the model are not dealt with. Note that a hierarchical structure which is similar to that in FIG. 9 in this specification at a glance is shown in p. 15 of NPL 2 (the published slide in NPL 1), but this represents a relationship between means (a route control protocol or an access control list), which is different from a search tree of a restoration command sequence shown in this specification.

As will be described below, the proposed technology is based on the advent of a high speed simulator (referred exactly to as a control-plane verifier) such as Batfish (NPL 3). Since changes in reachability at the time of setting update can be evaluated in a short period of time without waiting for the convergence of a route control protocol, approaches to attempt various settings as in the proposed technology are practical.

CITATION LIST

Non Patent Literature

NPL 1: A. Gember-Jacobson, A. Akella, R. Mahajan, and H. H. Liu, "Automatically repairing network control planes using an abstract representation," in Proceedings of the 26th Symposium on Operating Systems Principles, ser. SOSP '17. New York, NY, USA: ACM, 2017, pp. 359-373. (http://doi.acm.org/10.1145/3132747.3132753)

NPL 2: "Automatically repairing network control planes using an abstract representation," https://www.sigops.org/s/conferences/sosp/2017/slides/gemberj-sosp17-slides.pptx NPL 3: Batfish, https://www.batfish.org NPL 4: S. J. Russell and P. Norvig, "Artificial intelligence: a modern approach," Pearson Education, 2010.

SUMMARY OF THE INVENTION

Technical Problem

An object of the present disclosure is to perform automatic restoration from network failures even when complicated operations for executing a plurality of commands are required.

Means for Solving the Problem

A device of the present disclosure is a network setting device for being communicatively connected to a plurality of network devices and performing a setting of the plurality of network devices. The network setting device performs a first step for determining whether a network including the plurality of network devices satisfies a predetermined operational policy, and executes, until satisfaction for the predetermined operational policy, processing for: performing a second step for determining whether a reachable range of a packet expands with addition of one new candidate command of one or more new candidate commands to a temporary update command sequence on condition that the predetermined operational policy is not satisfied; adding the new candidate command to the temporary update command sequence on condition that the reachable range expands with the addition of the new candidate command, or deleting a command at an end of the temporary update command sequence on condition that the reachable range does not expand with addition of any one of the new candidate commands; and then returning to the first step.

A method of the present disclosure is a network setting method executed by a network setting device that is communicatively connected to a plurality of network devices and performs a setting of the plurality of network devices. The network setting method includes performing a first step for determining whether a network including the plurality of network devices satisfies a predetermined operational policy, and includes executing, until satisfaction for the predetermined operational policy, processing for: performing a second step for determining whether a reachable range of a packet expands with addition of one new candidate command of one or more new candidate commands to a temporary update command sequence on condition that the predetermined operational policy is not satisfied; adding the new candidate command to the temporary update command sequence on condition that the reachable range expands with the addition of the new candidate command, or deleting a command at an end of the temporary update command sequence on condition that the reachable range does not expand with addition of any one of the new candidate commands; and then returning to the first step.

A program of the present disclosure is a program for causing a computer to implement functions included in the device according to the present disclosure, and is a program for causing the computer to execute steps included in the method according to the present disclosure.

Effects of the Invention

According to the present disclosure, restoration from a network failure can be automatically performed even when complicated operations for executing a plurality of commands are required.

BRIEF DESCRIPTION OF DRAWINGS

FIG. 1 illustrates an example of an operational policy.
FIG. 6 is a setting update command sequence of the present disclosure.

DESCRIPTION OF EMBODIMENTS

Hereinafter, embodiments of the present disclosure will be described in detail with reference to the drawings. Note that the present disclosure is not limited to the embodiments described below. These embodiments are just illustrative examples, and the present disclosure can be implemented in forms in which various modifications and improvements are added on the basis of knowledge of those skilled in the art. Note that constituent elements with the same reference signs in the specification and the drawings are assumed to be the same constituent elements.

Preparation

An operational policy to be satisfied by a network will be defined. The operational policy is defined by a set of three, that is, a packet header, a transmission source router, and a destination router. In the packet header, information of a higher layer, such as a port number, may be defined in addition to a transmission source address and a destination address. For example, FIG. 1 illustrates an operational policy in which a transmission source address is 1.1.1.1 and a reception address is 9.9.9.9 in a packet header, a transmission source router is S, and a destination router is T. In the proposed technology, the settings of a router are changed to satisfy an operational policy.

Figure 2:
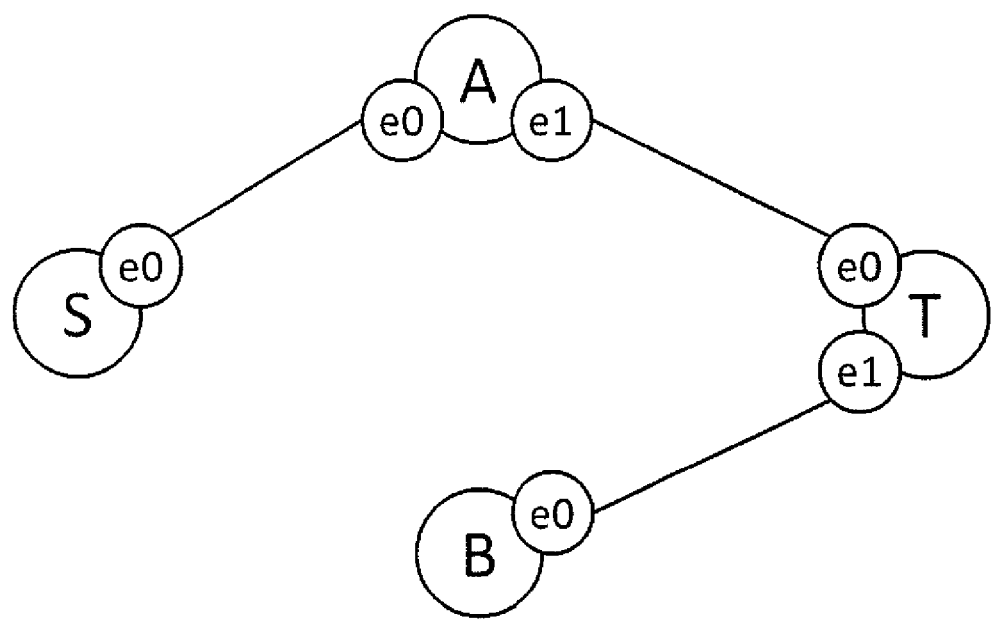
FIG. 2 illustrates an example of a network configuration.
Figure 3:
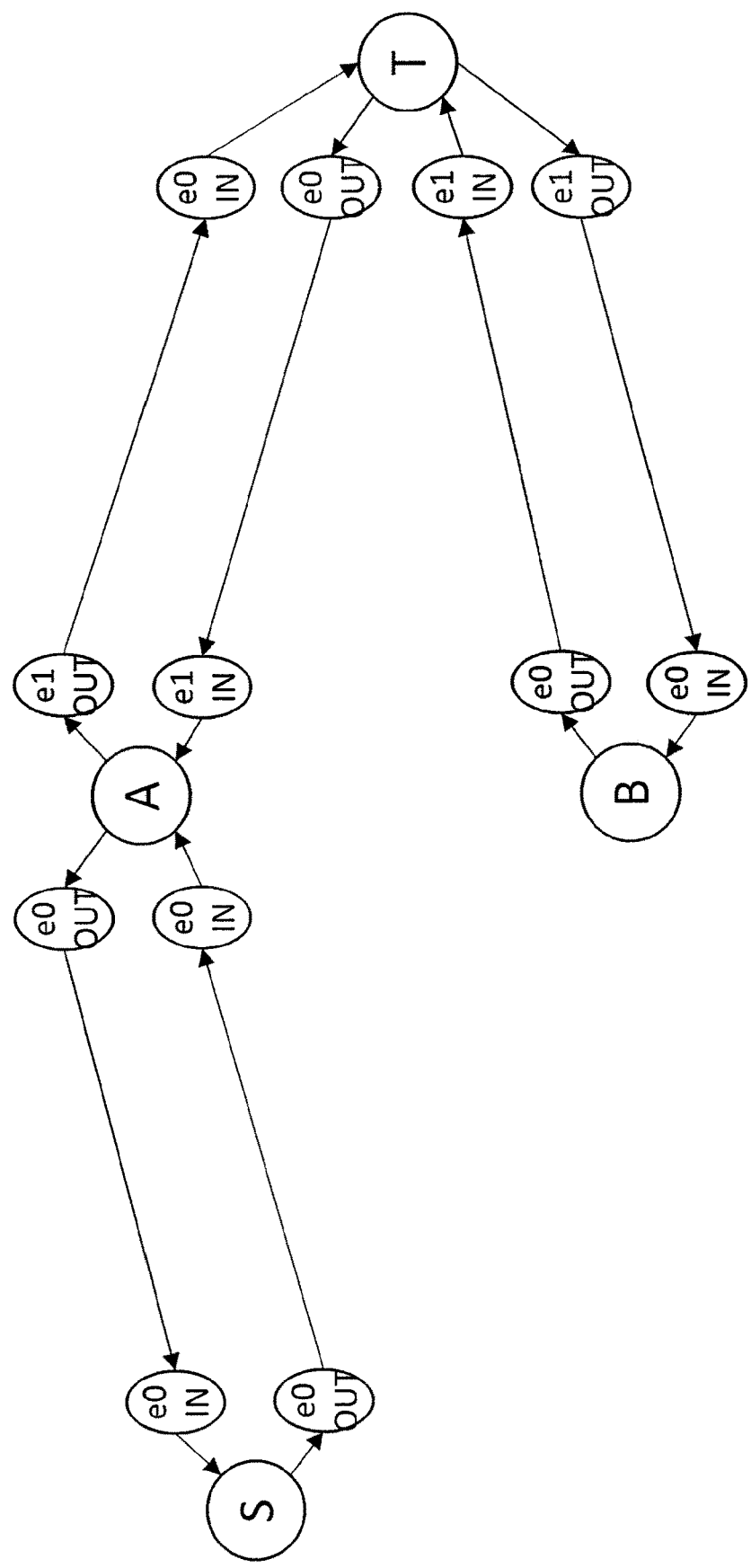
FIG. 3 illustrates an example of a reachability graph.

Next, a reachability graph will be defined. This is a directed graph used to evaluate the reachability of a packet. Vertices consist of routers and interfaces. However, the interfaces are sorted into inputs and outputs, and are prepared as pairs. An edge is set between the interfaces that are connected or between a router and an interface. When the network in FIG. 2 is expressed by a reachability graph, FIG. 3 is obtained. In the drawing, S, T, A, and B are routers, and e0 and e1 are interfaces.

In the present specification, a method of evaluating a reachable range is not limited. A packet may be transmitted from a router of an actual network or may be simulatively evaluated by a simulator. Note that the proposed technology is based on the advent of a high speed simulator (which is technically referred to as a control-plane verifier, and capable of evaluating reachability between designated interfaces using a function reachability) such as Batfish (NPL 3). Reachability at the time of setting update can be evaluated in a short period of time without waiting for the convergence of a route control protocol, and approaches to attempt various settings as in the proposed technology are practical.

Figure 4:
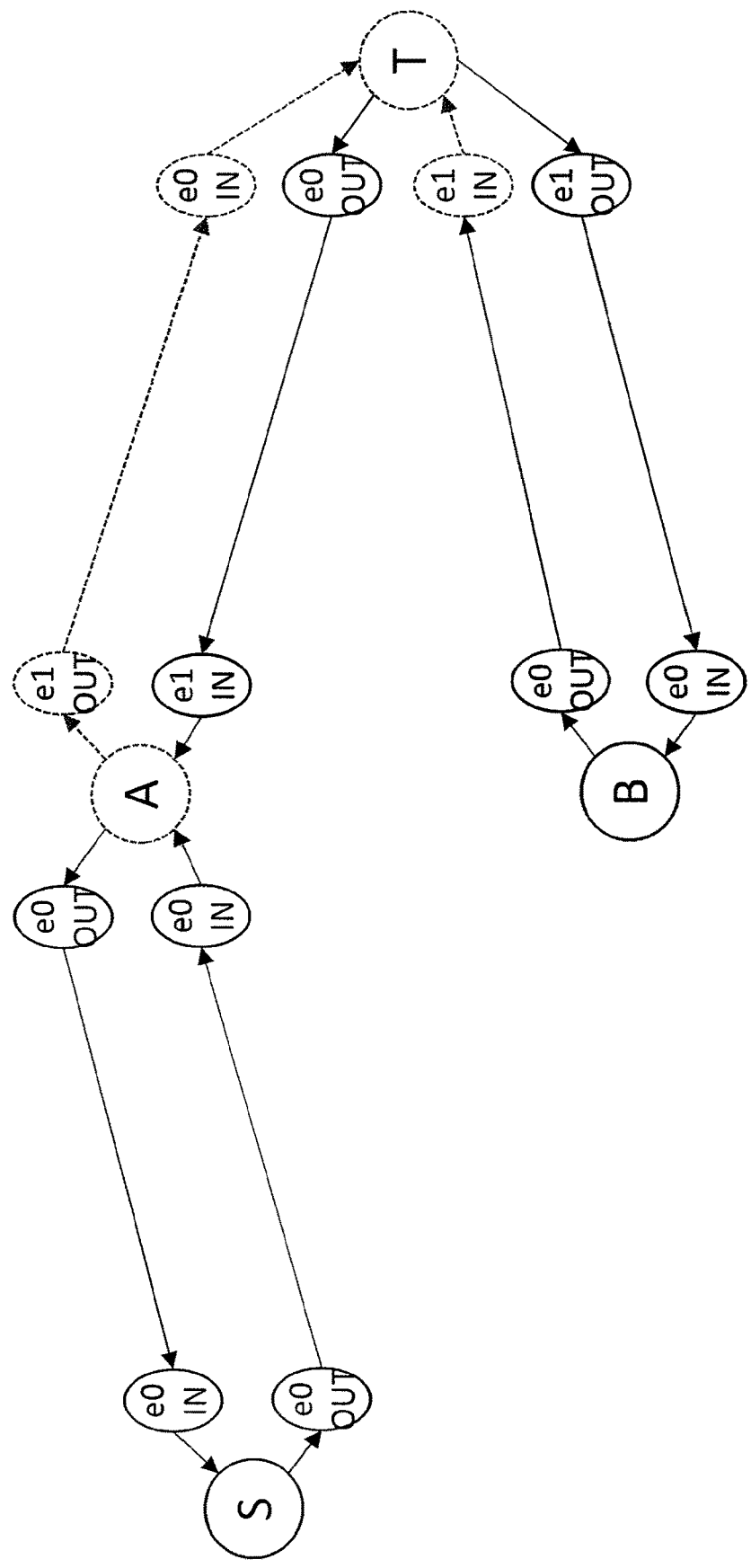
FIG. 4 illustrates an example of the display of a reachable range using a reachability graph.

FIG. 4 illustrates an example of the display of a reachable range on a reachability graph. A dashed line indicates a range in which a packet reaches a destination router when the packet and the destination router are given in accordance with a policy in certain router settings. In this example, the packet transmitted from a router A reaches a router T, but neither the packet transmitted from a router S nor B reaches the router T. The packet is also transmitted from the other routers even when a true transmission source is the router S, and a portion that causes this is identified by clarifying a reachable range.

Figure 5:
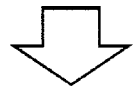
FIG. 5 illustrates an overview of the present disclosure.
Figure 5:
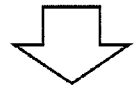

An overview of the proposed technology will be described using FIG. 5. Inputs of the proposed technology are as follows.

Topology (a router, an interface, and a connection relationship between interfaces)
Settings of each router
Operational policy In the proposed technology, a reachable range of a packet described in an operational policy is evaluated in accordance with a topology and router settings, and a command sequence necessary for setting update is output in the state of inconsistency with the policy. That is, an output in the proposed technology is as follows.

Setting update command sequence

Note that a setting update command is a pair constituted by a router that executes the command and the command itself (FIG. 6). In addition, the commands in the present disclosure include any commands related to the reachability of a packet. Specifically, the commands are setting commands related to an interface address, a route control protocol, and an access control list.

Proposed Technology

Figure 7:
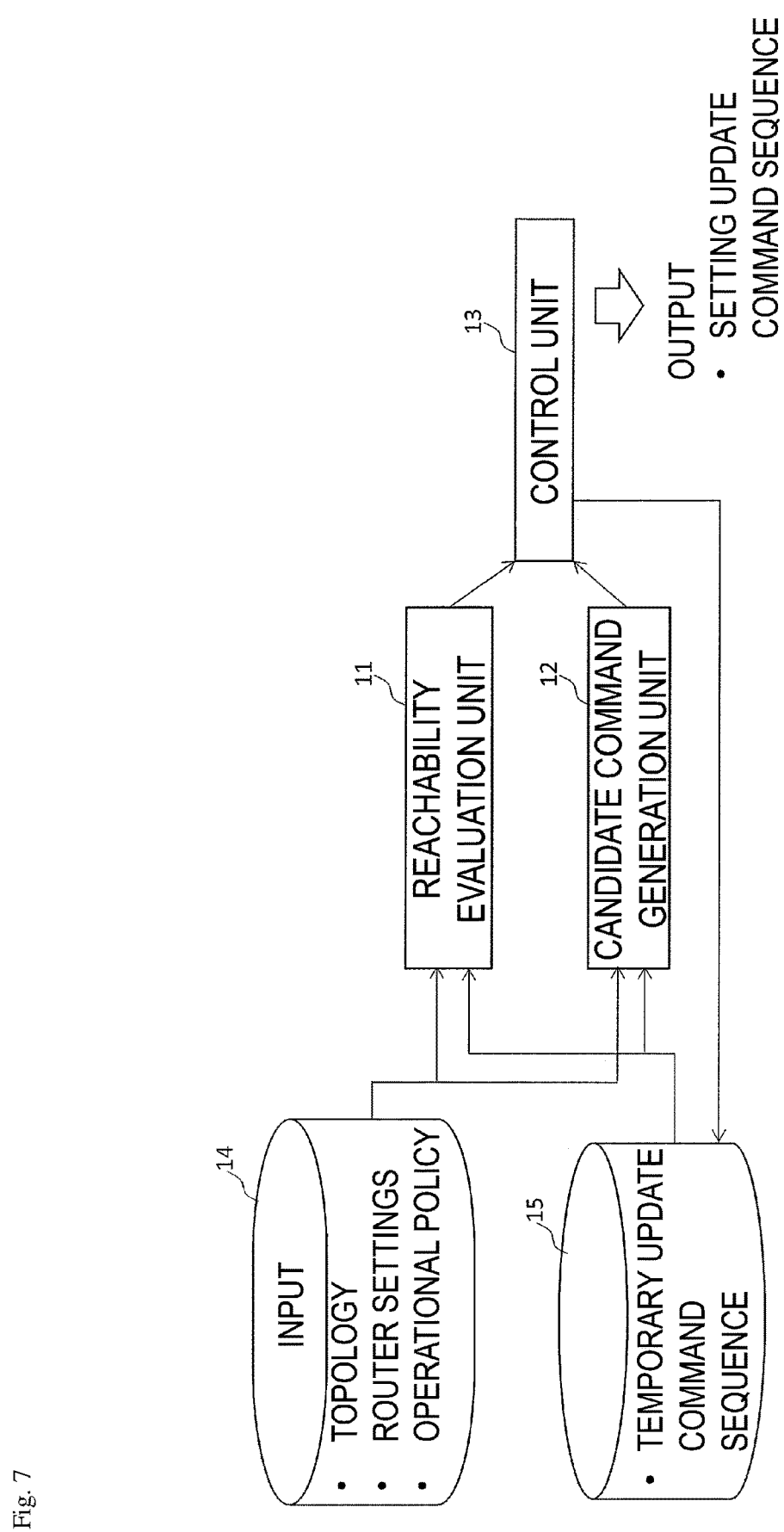
FIG. 7 is a system configuration diagram illustrating an example of the present disclosure.
Figure 8:
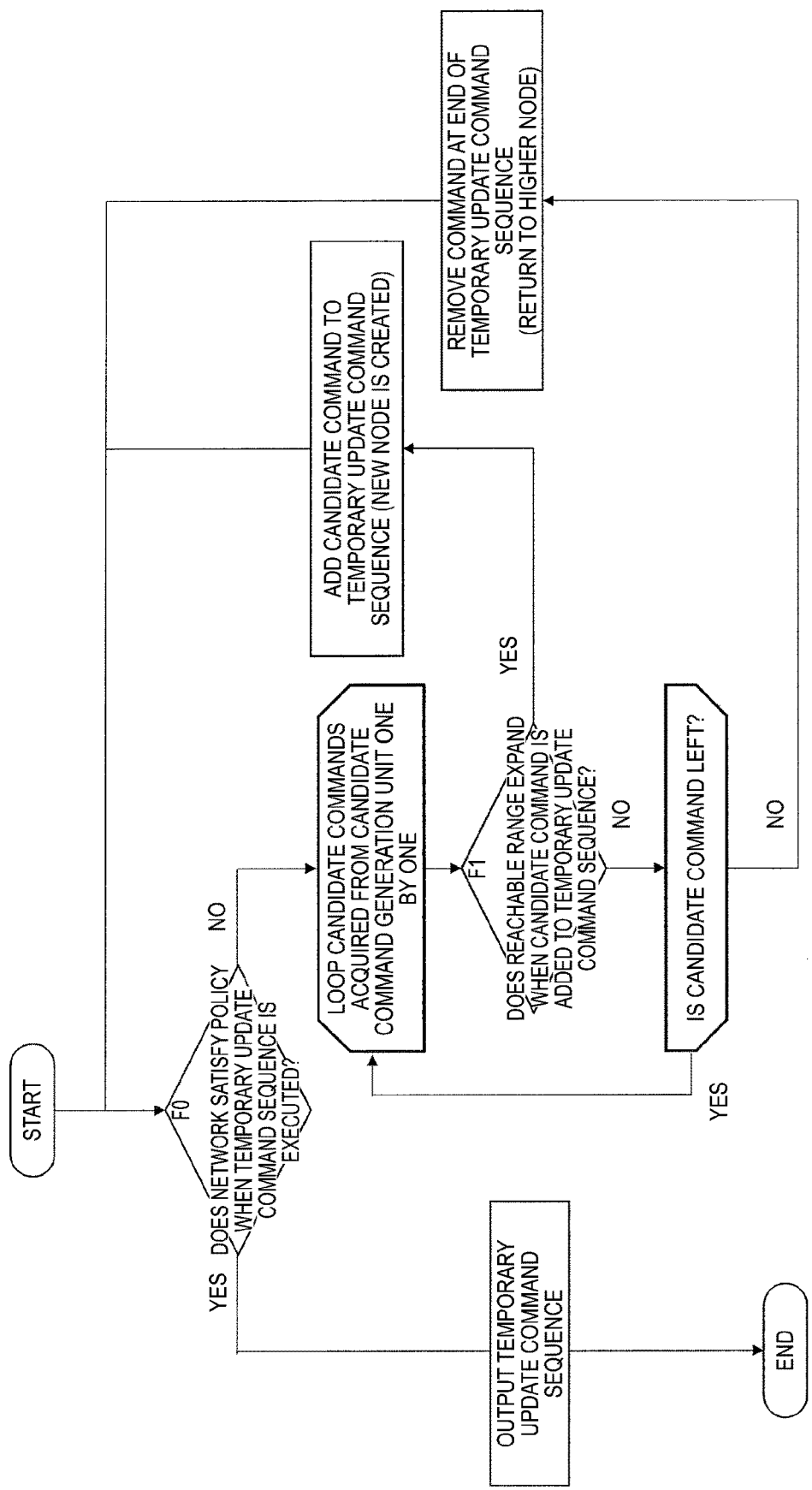
FIG. 8 illustrates an example of a flowchart of a control unit of the present disclosure.
Figure 9:
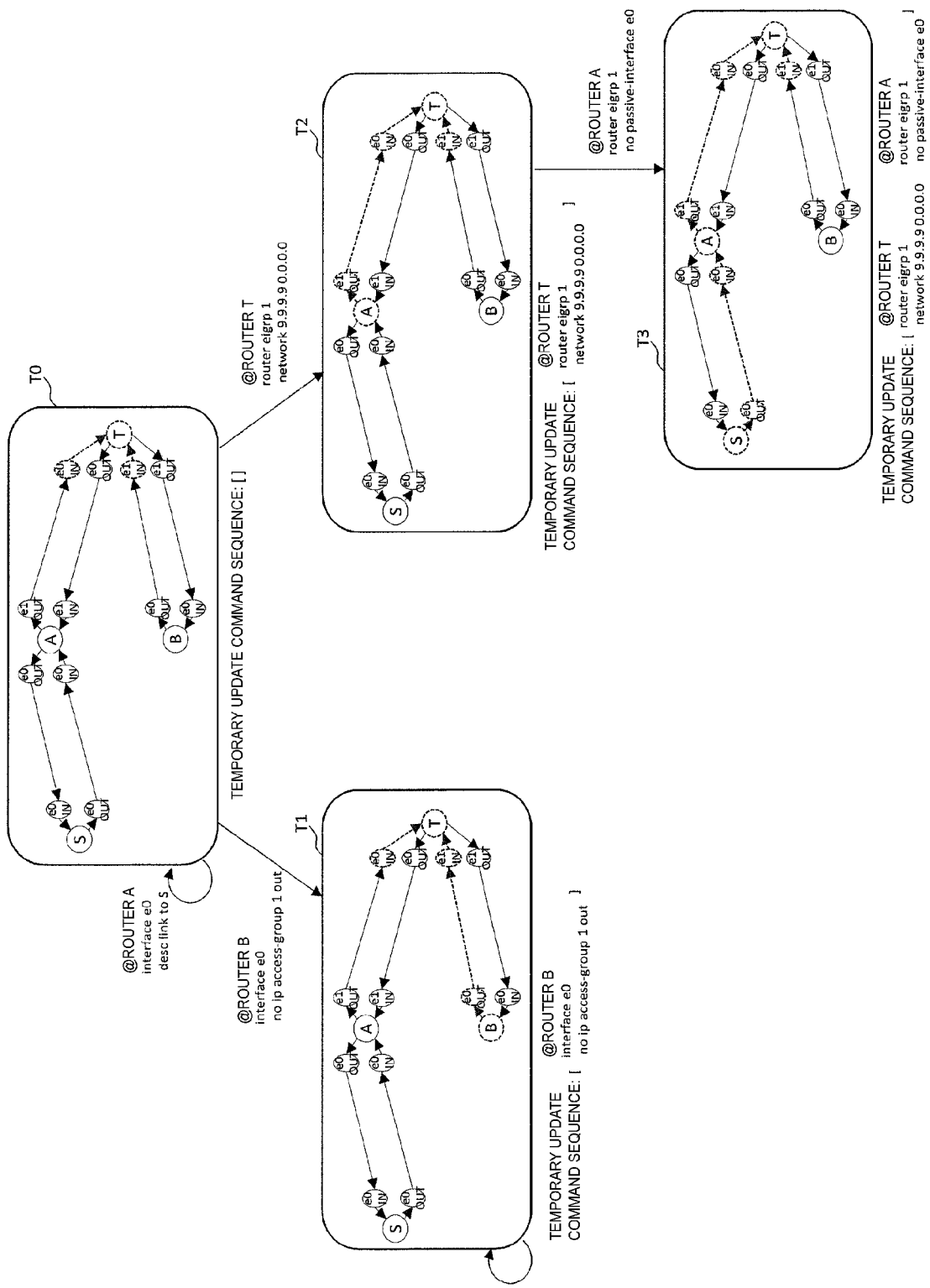
FIG. 9 illustrates an example of a search tree of the present disclosure.

A restoration method according to the proposed technology will be described. FIG. 7 illustrates a system configuration, and FIG. 8 is a flowchart of a control unit. FIG. 9 is a conceptual diagram illustrating a process for searching for a setting update command sequence as a tree. Each node of the tree (T0, T1, . . . ) indicates a reachable range, and each branch is a setting update command. The process starts from a contact point T0 at the highest position, and a reachable range expands every time a setting update command is input and the process moves to a subordinate node. A setting command sequence (temporary update command sequence) for reaching a destination is displayed at each node. The contact point T0 at the highest position among the nodes of the tree is referred to as a root.

As illustrated in FIG. 7, a network setting device according to the present disclosure includes a reachability evaluation unit 11, a candidate command generation unit 12, and a control unit 13. The device according to the present disclosure can be implemented using a computer and a program, and the program can be recorded in a recording medium or provided through a network.

An input 14 of the network setting device is set to be the policy in FIG. 1 and topology information of the network in FIG. 2. For settings, a reachable range is displayed at each node, instead of showing specific content.

The network setting device according to the present disclosure is communicatively connected to an actual network or a simulator (not illustrated).

The candidate command generation unit 12 generates a candidate command. The command is any executable command of a router.

The control unit 13 causes the actual network or the simulator to execute the command generated by the candidate command generation unit 12.

The reachability evaluation unit 11 determines a reachable range of a packet in executing a command in the actual network or the simulator.

As illustrated in FIG. 8, a network setting method according to the present disclosure, which is a method for searching for a command sequence to be set for a plurality of network devices, includes performing a first step F0 for determining whether a network having executed a temporary update command sequence satisfies a predetermined operational policy, and includes executing, until satisfaction for the predetermined operational policy, processing for: performing a second step F1 for determining whether a reachable range of a packet expands with addition of one new candidate command of one or more new candidate commands to the temporary update command sequence on condition that the predetermined operational policy is not satisfied; adding the new candidate command to the temporary update command sequence on condition that the reachable range expands with the addition of the new candidate command, or deleting a command at the end of the temporary update command sequence on condition that the reachable range does not expand with addition of any one of the new candidate commands is added; and then returning to the first step F0.

A reachable range with the initial settings is shown as a node T0 in FIG. 9. The reachability evaluation unit 11 determines that no packet from any router reach the destination except for a router T that works as a destination. In step F0 in FIG. 8, the control unit 13 determines that the current reachable range does not satisfy the policy.

Next, the candidate command generation unit 12 in FIG. 7 generates some candidate commands. In this specification, this generation method is not limited. A command may be selected from a given set of commands, or a command suitable for the current settings or a reachable range may be selected by machine learning. While NPL 1 limits a target command type to route information exchange, the proposed technology can handle any command The reachability evaluation unit 11 in FIG. 7 evaluates a reachable range when a candidate command is executed (step F1 in FIG. 8). The control unit 13 adopts the command when the reachable range has expanded. Even when the reachable range expands slightly, the policy need not be satisfied. The adopted command is added to a temporary update command sequence 15 in FIG. 7.

In the example illustrated in FIG. 9, first, the control unit 13 executes a command (@router A . . . ) given to a self-loop (a branch being returned to itself) at the node T0. The reachability evaluation unit 11 determines that a packet from the router A returns to the router A. In this instance, the control unit 13 determines that the reachable range has not expanded.

Subsequently, the control unit 13 executes a command (@router B . . . ) that is given to the branch from the root T0 to the node T1. The command causes the router B to execute "interface e0; no ip access-group 1 out". The reachability evaluation unit 11 determines that the packet from the router B has reached the router T. In this instance, the control unit 13 determines that the reachable range has expanded. At this point, only this command is registered in a temporary update command list 15 at the node T1.

The control unit 13 continues searching because the policy is still not satisfied. However, it is assumed that the reachable range has not expanded any more even when all candidate commands are attempted at the node T1 (at the node T1 in FIG. 9, a command to be given to a self-loop is omitted). In this instance, the control unit 13 removes a command at the end of the temporary update command list and returns to the upper node. In this example, the control unit returns to the node T0 which is in the initial state.

Returning to the node T0, the control unit 13 tests a candidate command that has not been previously attempted. A command (@router T . . . ) shown in a branch from the node T0 to a node T2 is executed this time. This command executes "router eigrp 1; network 9.9.9.9 0.0.0.0" in the router T. The reachability evaluation unit 11 determines that a packet from the router A reaches the router T. In this instance, the control unit 13 determines that the reachable range has expanded. However, the policy is not satisfied.

The control unit 13 proceeds searching to the node T2. Here, a command (@router A . . . ) shown in a branch from the node T2 to a node T3 is executed. This command executes "router eigrp 1; no passive-interface e0" in the router A. The reachability evaluation unit 11 determines that a packet from the router S reaches the router T. In this instance, the control unit 13 determines that the reachable range has expanded. In addition, a packet reaches the router T which is a destination from the router S which is a transmission source, and thus the control unit 13 determines that the policy is satisfied. The control unit 13 completes the searching here and outputs the temporary update command sequence 15 as a setting update command sequence.

Regarding Search Algorithm

The flowchart (FIG. 8) and the search tree (FIG. 9) in this specification are based on a search algorithm referred to as "depth first". This follows a procedure of proceeding downward from the contact point T0 corresponding to the root of the search tree and taking a step backward at the end. There are various other variations in the search algorithm, such as "breadth-first search" and "iterative deepening," the order of tracing nodes varies depending on the algorithm, and the calculation cost and the characteristics of a command sequence to be obtained change.

Note that the change of the search algorithm follows the method described in NPL 4 (Section 3.4), and can be easily realized. For example, in Section 3.4.3 in NPL 4, an LIFO queue (also referred to as a stack) is used for depth-first search, but a FIFO queue is used for breadth-first search. In this specification, a temporary update command sequence is operated as an LIFO queue (a flowchart is written as such), but breadth-first search is performed when using an FIFO queue. For this reason, in this specification, no separate description is given for each of the search algorithms One of the objects of the proposed technology is to put network restoration work into a search framework by adding commands while expanding reachability, thereby benefiting from existing research on search algorithms Developmental Usage Mode A developmental usage mode will be supplemented.

Figure 10:
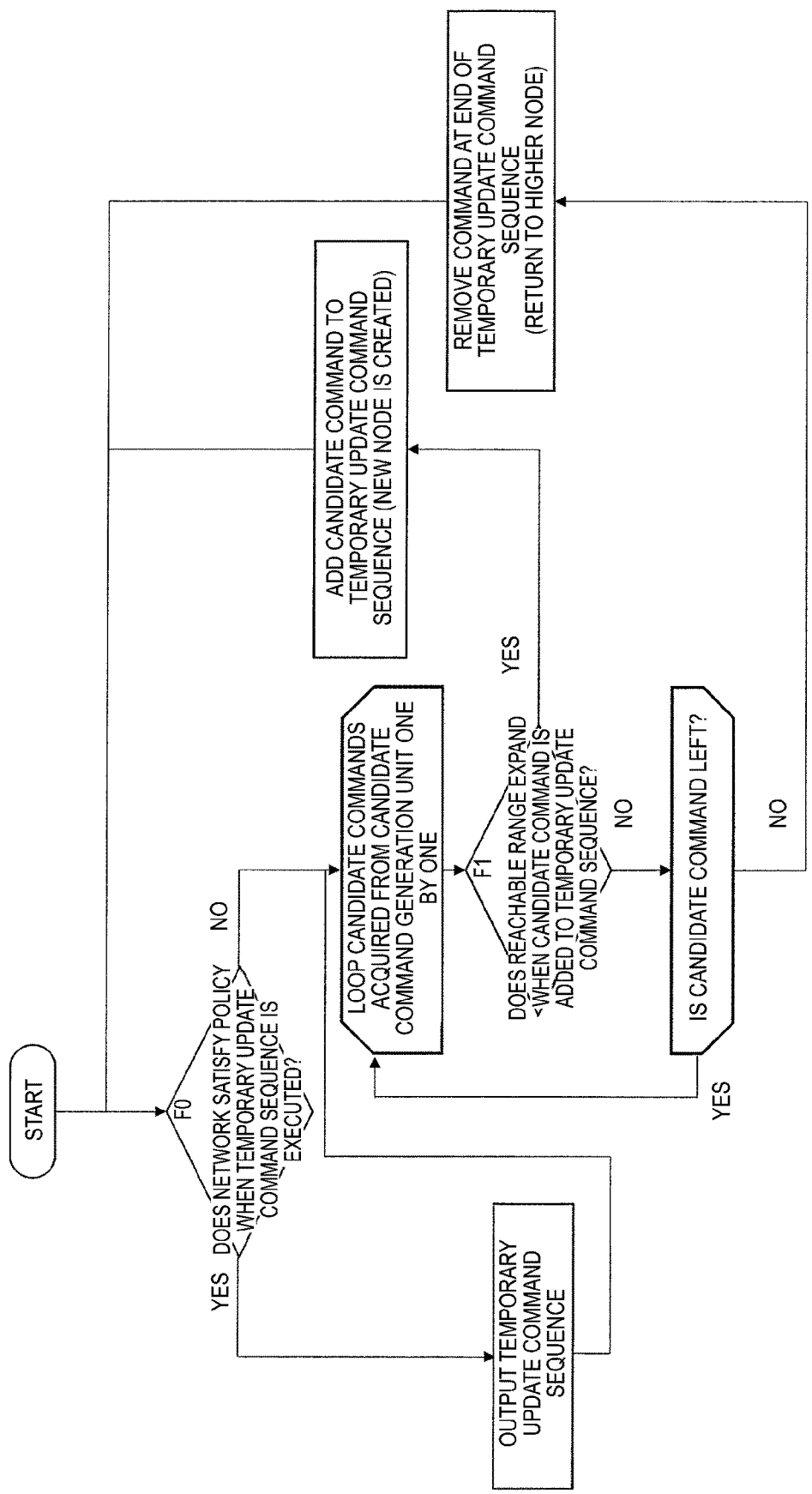
FIG. 10 illustrates an example of a flowchart of a control unit where a plurality of command sequences are output.

When two or more command sequences satisfying a policy are desired to be obtained, a temporary update command sequence is output to cause the processing to return after determining "Yes" in step F0 in the flowchart as illustrated in FIG. 10.

When a plurality of policies are designated, all setting update command sequences is executed by satisfying the policies one by one in order.

Although a policy is defined herein as "one-way reachability," a policy may be defined as being bi-directional such as ping. In this instance, designation is performed by dividing policies into two policies, that is, inward and outward policies.

A policy may designate not only a transmission source and a destination, but also a route like traceroute. In that instance, it is also examined whether a reachable range is along a designated route at the time of examining the expansion of the reachable range in step F1 of the flowchart (FIG. 8).

The present disclosure is not limited to a router, and can be applied to any network device that constitutes a network.

Effects of the Present Disclosure

The settings of a router are updated to satisfy an operational policy, and restoration from a network failure is performed.

Point of the Present Disclosure

The present disclosure is not limited to a specific network model, and restoration from a failure is performed using any command Complicated restoration work that requires a plurality of commands can also be performed by adding commands while gradually expanding reachability.

INDUSTRIAL APPLICABILITY

The present disclosure can be applied in the information communication industry.

REFERENCE SIGNS LIST

11 Reachability evaluation unit for actual network
12 Candidate command generation unit
13 Control unit
14 Input unit
15 Temporary update command sequence

The invention claimed is:

1. A network setting device for being communicatively connected to a plurality of network devices and performing a setting of the plurality of network devices, comprising:
   a processor; and
   a storage medium having computer program instructions stored thereon, when executed by the processor,
   performs a first step for determining whether a network including the plurality of network devices satisfies a predetermined operational policy, and executes, until satisfaction for the predetermined operational policy, processing for:
   performing a second step for determining whether a reachable range of a packet in the plurality of network devices expands with addition of one new candidate command of one or more new candidate commands to a temporary update command sequence generated by a third step on condition that the predetermined operational policy is not satisfied, where each candidate command is a pair comprised by a network device that executes the command and the command itself;
   performing the third step for adding the new candidate command to the temporary update command sequence on condition that the reachable range in the plurality of network devices expands with the addition of the new candidate command, or deleting a command at an end of the temporary update command sequence on condition that the reachable range does not expand with addition of any one of the new candidate commands; and then
   returning to the first step.

2. A non-transitory computer-readable medium having computer-executable instructions that, upon execution of the instructions by a processor of a computer, cause the computer to function as the network setting device according to claim claim 1.

3. A network setting method executed by a network setting device that is communicatively connected to a plurality of network devices and performs a setting of the plurality of network devices, the network setting method comprising performing a first step for determining whether a network including the plurality of network devices satisfies a predetermined operational policy, and comprising executing, until satisfaction for the predetermined operational policy, processing for:
   performing a second step for determining whether a reachable range of a packet in the plurality of network devices expands with addition of one new candidate command of one or more new candidate commands to a temporary update command sequence generated by a third step on condition that the predetermined operational policy is not satisfied, where each candidate command is a pair comprised by a network device that executes the command and the command itself;
   performing the third step for adding the new candidate command to the temporary update command sequence on condition that the reachable range in the plurality of network devices expands with the addition of the new candidate command, or deleting a command at an end of the temporary update command sequence on condition that the reachable range does not expand with addition of any one of the new candidate commands; and then
   returning to the first step.

* * * * *